United States Patent [19]
King

[11] Patent Number: 6,116,763
[45] Date of Patent: Sep. 12, 2000

[54] WHEEL ILLUMINATION DEVICE

[76] Inventor: Richard John King, Downs Road South, Brydone RD 4, Gore, New Zealand

[21] Appl. No.: 09/269,722
[22] PCT Filed: Sep. 29, 1997
[86] PCT No.: PCT/NZ97/00121
  § 371 Date: Apr. 1, 1999
  § 102(e) Date: Apr. 1, 1999
[87] PCT Pub. No.: WO98/15426
  PCT Pub. Date: Apr. 16, 1998

[30] Foreign Application Priority Data

Oct. 10, 1996 [NZ] New Zealand ............................ 299551
Apr. 23, 1997 [NZ] New Zealand ............................ 314665

[51] Int. Cl.[7] .................................................. H02K 11/00
[52] U.S. Cl. ..................... 362/500; 362/500; 362/192; 362/193; 310/73; 310/75 C
[58] Field of Search ................................ 362/500, 192, 362/193; 310/67 A, 67 B, 73, 75 C

[56] References Cited

U.S. PATENT DOCUMENTS 4,725,928  2/1988  Strepek ..................................... 362/485
4,775,919  10/1988  Pearsall et al. ......................... 362/500
4,893,877  1/1990  Powell et al. ............................ 362/464

FOREIGN PATENT DOCUMENTS

53167/86  7/1986  Australia .

*Primary Examiner*—Sandra O'Shea
*Assistant Examiner*—Ali Alavi
*Attorney, Agent, or Firm*—Jacobson, Price, Holman & Stern, PLLC

[57] ABSTRACT

A method and apparatus for illuminating rotating wheels are described. The device requires no external power and relies on the rotation of the wheeled power generator located in the hub cap or other mounting area of the wheel. Construction comprises a coil having an axis of rotation, the coil being substantially on the axis of the wheel so that when the wheel rotates, the coil rotates similarly. A magnet is mounted around the coil in such a manner that it is self orienting. This is achieved by means of an asymmetric weight which is of sufficient dimensions and weight so as to counteract the rotational tendencies of the structure to which it is rotatably mounted. In a preferred embodiment, the weight is attached to the magnet by one or more elongated members incorporating compression means which absorb transitory vibrations experienced by the weight during the vehicle's movement. The present invention may find application in road vehicles, although application has also been found in railway wagons and the like.

12 Claims, 3 Drawing Sheets

WHEEL ILLUMINATION DEVICE

TECHNICAL FIELD

The present invention relates to the illumination of vehicle wheels. More particularly, although not exclusively, the present invention relates to apparatus for illuminating a vehicle wheel hub wherein the hub is illuminated as a result of the vehicles motion and where the illumination device does not require an external electrical supply in order to operate. The present invention also relates to a safety device for vehicles.

BACKGROUND TO THE INVENTION

The idea of illuminating vehicle wheels or wheel hub caps is well known. The concept stems from safety considerations, more particularly the need to enhance the visibility of trucks and other heavy vehicles when travelling at night. The presence of moving (ie; rotating) lights on a wheel hub cap alerts other road users to the presence of the illuminated vehicle. When vehicles are travelling in close proximity at night, such illumination methods can also warn a driver when they are too close to the side of the illuminated vehicle.

Previous designs of hub cap illumination devices have incorporated an electrical supply powered by the vehicle's internal electrical system. However this necessitates a complicated arrangement of connectors and pick-ups adapted to transmit electrical power through a rotational coupling to the hub. Such a device is complicated and incorporates a number of moving parts. It can therefore be prone to breaking down and the retrofitting of such devices would entail increased cost.

Other methods of powering hub illumination devices include locating batteries within the hub cap itself. The lights powered by such batteries may be activated by centrifugal forces which close a switch and thus complete the illumination circuit.

Clearly this latter method may be deficient in that batteries have a finite lifetime and may be exhausted at inconvenient times and in locations where a replacement battery is not readily available. Also, batteries are a disposable item and this consumption increases the cost of running the vehicle.

While being suitable in some situations, the first embodiment of the present invention can suffer binding when vibrated. Under certain circumstances the first embodiment of the present invention can suffer from the effects of vibration whereby under certain conditions, the rotating shaft on which the coil is mounted interacts with the stationary magnet/weight so that the magnet rotates with the axle thus preventing defeating the induction of currents in the coil. It is believed that this binding or sticking is caused by the rotating parts vibrating under resonance conditions whereby the vibration frequency of the two components is such that the radial component of the force between the axle and the magnet bearing is sufficient to prevent the magnet/weight orienting itself in space (ie; non-rotating in relation to the axle and coil).

Accordingly, it is an object of the invention to provide a wheel/hub cap lighting system which is self-contained, does not require the use of batteries is compact and highly resistant to the effects of vibration and overcomes or at least mitigates some of the above mentioned problems. It is also an object of the invention to provide the public with a useful choice.

DISCLOSURE OF THE INVENTION

In one aspect the invention provides an apparatus for providing illumination on a hub cap of a rotatable wheel including:

a coil incorporating a shaft and output leads;

a magnet adapted to be rotatable around said shaft and arranged so that when the magnet rotates around the coil, magnetic fields induce electrical currents in windings of the coil;

a housing means adapted to contain the magnet and coil wherein said shaft is held substantially in fixed relation to the housing means;

a mounting plate incorporating a plurality of light emitting devices and associated circuitry wherein the electrical current produced by the rotating magnet is supplied to the circuit; and an asymmetric weight attached in fixed relation to the magnet so that the magnet has a tendency to remain in a fixed orientation in space and wherein the mounting plate and housing are fixed together and rotated around the axis of the shaft when the housing and mounting plate are attached to a wheel in such a manner that the shaft is substantially coincident with the axis and the wheel is rotated, the magnet remains in a substantially fixed orientation and the coil rotates therein thus supplying electrical current to the light emitting devices by way of the associated circuitry.

Preferably the magnet is in the form of a cylindrical permanent magnet.

Preferably the coil comprises a shaft and winding mounting means associated therewith, wherein the windings are connected to the output leads.

Preferably the associated electronics incorporate a regulator adapted to regulate the voltage and/or current supply to the light emitting devices.

Preferably the light emitting devices are light emitting diodes.

Preferably the mounting plate is substantially triangular in shape with the light emitting devices located at the vertices of the triangle and wherein the mounting plate is attached to a wheel or wheel hub so that its centre is located substantially on an axle axis.

Preferably the weight corresponds to a half annulus of lead or similar heavy material which is secured to an outer surface of the magnet.

In an alternative embodiment, the coil may be weighted and the magnet held fixed in relation to the mounting plate.

According to an alternative preferred aspect, the present invention provides an apparatus for providing illumination on a hubcap of a rotatable wheel, the apparatus including:

an alternator coil wound onto a shaft, the alternator having output leads;

a magnet support housing shaped so as to surround the coil;

a plurality of magnets arranged radially around the coil arranged so that magnetic fields associated with the magnets induce electrical currents in the windings of the coil when moved in relation thereto, wherein the shaft is held substantially in fixed relation to the rotatable wheel and the shaft has an axis substantially coincident with an axis of rotation of the wheel;

one or more illumination means and associated circuitry, located on the hubcap or other support structure wherein the current produced by the rotating magnets is supplied to the circuit; and a weight attached to the magnet housing and located so that magnet housing has a tendency to remain in fixed orientation in space and wherein the shaft is held in fixed relation to the hubcap and located so that when the hubcap is fixed to a wheel, rotation of the wheel causes the shaft and hence coil to rotate and the magnet housing remains substantially fixed in space thus causing a current to be induced in the coil; whereby the attachment means is adapted to allow the weight to be displaced radially with respect to the magnet in a constrained manner to provide vibration damping.

The attachment means is preferably adapted to damp vibratory motion transmitted to the weight, the vibration of the shaft being caused by the wheel passing over an uneven surface.

As the magnet housing tends to remain rotationally fixed in space the displacement direction is substantially vertical.

The attachment means is preferably in the form of one or more members which slides through apertures in the magnet housing, the members being attached at one end to the weight and at the other incorporating securing means preventing the weight and members from detaching from the attachment means.

Preferably, the attachment means further includes first resilient means adapted to cushion the movement of the weight and members against transitory displacements.

Preferably the first resilient means are springs arranged to return the weight and members to a fixed location with respect to the magnet housing.

The first resilient means is preferably adapted to allow the members to move through the aperture in the magnet housing in response to a transitory displacement force and then return to a static location, more preferably the first resilient means cushioning transitory downward forces.

Preferably the attachment means further includes second resilient means located and adapted to cushion impact of the weight against the magnet housing when the transitory force is sufficient to move the weight to the extremities of its travel.

The first resilient means may be a coil spring having a longitudinal axis coincident with a corresponding member onto which it is threaded and the second resilient means is preferably a rubber ring surrounding a corresponding member and located between the weight and the magnet housing.

In an alternative embodiment, the second resilient means may be a coil spring.

Preferably the magnets are cylindrical in shape and have their poles oriented towards the shaft, preferably in alternating north south orientation around the circumference of the magnet housing.

The magnets are preferably embedded in the magnet housing and oriented so that their longitudinal axes are perpendicular to the rotational axis of the shaft.

Preferably the magnet housing incorporates a cylindrical ferrometallic sleeve substantially coaxial with the longitudinal axis of the shaft, the sleeve dimensioned and located to fit around a portion of the magnet housing to concentrate the magnetic field lines produced by the magnets.

BRIEF DESCRIPTION OF THE DRAWINGS

The present invention will now be described by way of example only and with reference to the drawings in which:

Referring to FIG. 1, an exploded view of one embodiment of an illumination device according to the present invention is shown. A coil 4 is constructed in a known manner and incorporates coils of wire wound around adjacent spindle arms (not shown). The coil used in the present embodiment of the invention may be constructed substantially as is known in the art and is similar to coils found in electric motors or the like.

Figure 1:
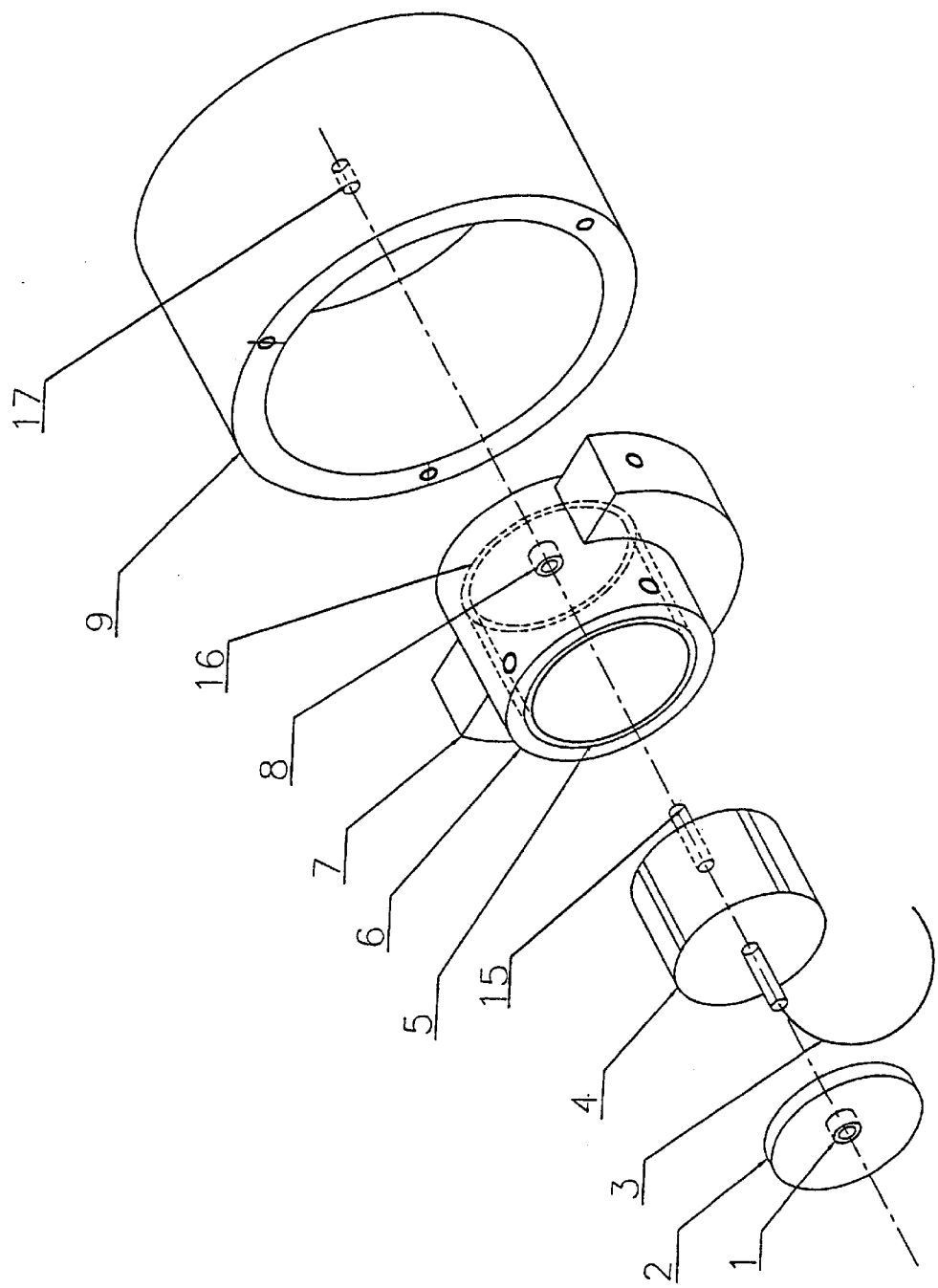
FIG. 1 illustrates an exploded view of a generator used in wheel/hub illumination.

The coil is mounted on a shaft 15. The coil and shaft are mounted rotatably within an magnet 16. The magnet 5 is mounted in an inner casing 6. The magnet 6 is held in fixed relation to the casing 6 by the means of grub screws or the like. Thus when the coil 4 is rotated, currents are induced in the coil thereby producing a current output in the leads 3.

The coil shaft 15 is mounted at one end of the magnet by means of a bearing 8 with the shaft protruding through the bearing and being mounted in an outer casing 9 by means of an aperture 17. The connection end of the coil is mounted in a bearing 1 in an end cap 2 which is fixed in the open end of the magnet by means of grub screws or the like.

The coil shaft 15 is mounted in the outer casing aperture and secured therein by a grub screw or the like.

A weight 7 is attached to the outer surface of the inner casing 6 by means of grub screws or the like. The weight 7 is formed as a half or partial annulus and is shaped so as to allow the magnet to rotate around the shaft of the coil 4 within the outer casing 9.

Thus it can be seen that when the outer casing 9, incorporates the coil, magnet and end cap, is mounted on a wheel hub, rotation of the wheel hub will cause the outer casing 9 and the coil 4 to rotate with respect to the weighted and rotatable magnet 16. The magnet, while being free to rotate around the coil, is oriented in space by means of the weight 7.

Therefore rotation, substantially around the coil shaft, of the assembled device will produce a current in the output leads 3.

Figure 2:
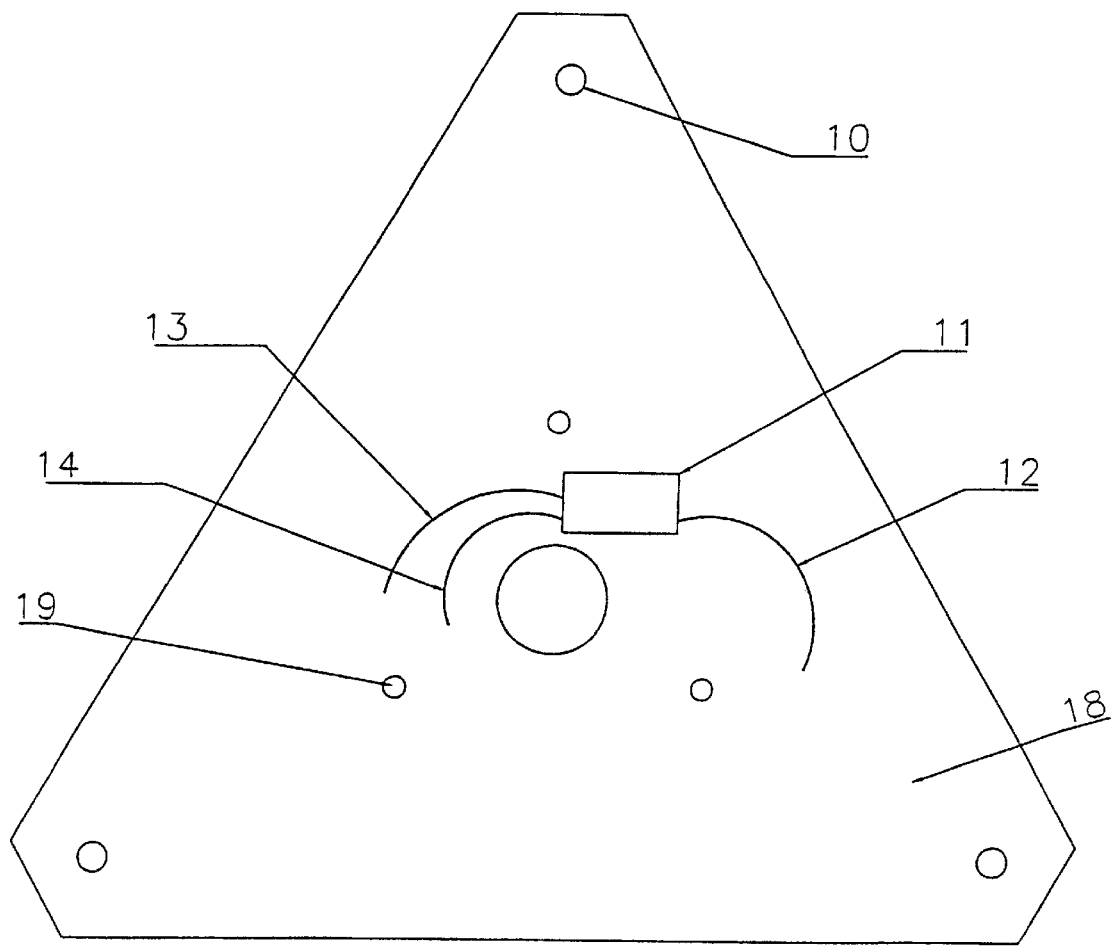
FIG. 2 illustrates a side on view of a mounting plate for a wheel hub.

FIG. 2 illustrates a mounting plate for the wheel comprising a mounting plate 18, regulator 11, connection or outlet leads 12, 13 and 14 and LEDs 10. The base plate 18 also incorporates apertures located so as to allow screws to be inserted therethrough thus fixing the outer casing 9 in place. Once the outer casing is fixed in place along with the magnet and coil, the current leads 3 are connected to the power regulator 11. The regulator 11 ensures that the voltage and/or current supplied to the LEDs 10 remains substantially constant over a wide range of wheel rotation rates.

It is considered that construction of such a regulating circuit would be within the scope of one skilled in the art. The connection leads, 12, 13 and 14 penetrate the base plate or are laid out along the surface of the base plate and supply a voltage to the LEDs 10.

In use, the assembled base plate and outer casing/magnet/coil are fixed to the base plate. The base plate is then attached to the wheel so that the rotational axis of the coil is substantially coincident with the rotational axis of the wheels' axle. Some latitude in the precise location is allowable. However, if the axis of the coil is too far off the rotational axis of the wheel, the resulting centrifugal force will interfere with the self orienting behaviour of the magnet.

Figure 3:
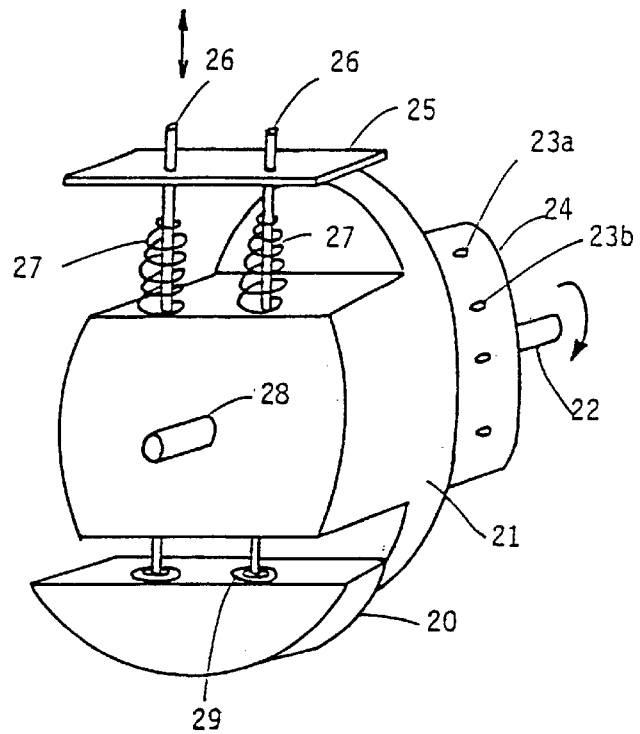
FIG. 3 illustrates a perspective of a power generation device for use in illuminating a rotating wheel.
Figure 4:
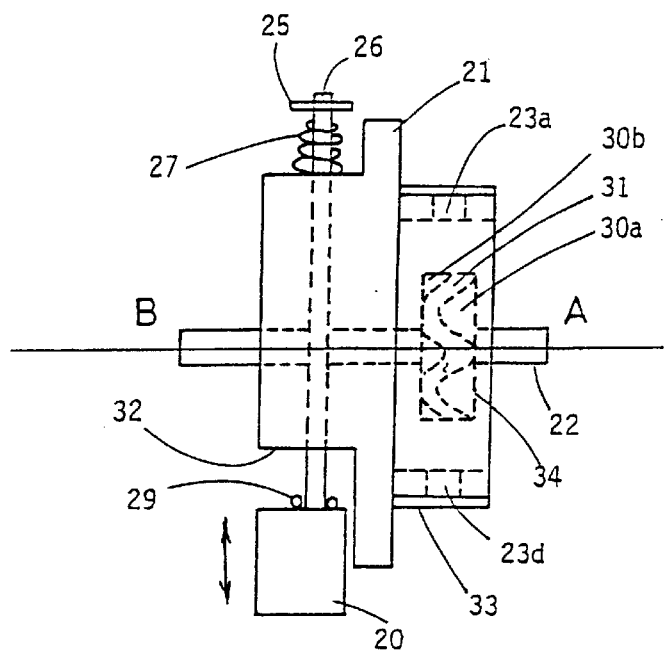
FIG. 4 illustrates the layout of a magnet housing.

An alternative, preferred embodiment is shown in FIG. 3 and FIG. 4. Here a perspective schematic of an improved wheel illumination device is shown. A shaft 22 carries an alternator 34 having windings 31 around a support reel (not shown). The alternator incorporates a metallic sleeve formed in two parts 30a, 30b so that when the two parts are assembled, a series of apertures is formed around the circumference of the coil.

The coil is wound circumferentially onto a support reel which is threaded onto a shaft 22 which is in fixed relation to the wheel or hubcap to which the present device to be attached. Therefore, as the wheel rotates the shaft the coil will also rotate. The shaft may be secured at both ends (A and B in FIG. 4) to a mounting, housing, hubcap or device similar to that described in the previous embodiment. The housing or mounting device can be modified to that it may be easily attached and detached from the wheel assembly. This may be effected using screw attachments or fasteners.

A hollow magnet housing 21 is also mounted on the shaft. However, the housing is freely rotatable with respect to the shaft and therefore the wheel. Rotation of the magnet housing is assisted by a bearing 28 (not shown). Suitable bearings may be "nyloil" or roller bearings.

The magnet housing has embedded therein a plurality of small, cylindrical magnets 23a, 23b etc. The cylindrical magnets are arranged so that alternating North and South pole sections are oriented so as to face the interior of the winding apertures (ie; toward the coil). This arrangement provides a continuous magnetic flux pattern which is admitted to the winding region periodically as the winding rotates thus inducing a current in the winding. In use, the alternator is located inside the magnet housing proximate to magnets 23a–d.

The concentration of the magnet flux intensity may be increased by locating a cylindrical ferrometallic keeper section 33 around the magnet array. This component is in the form of a sleeve around the exterior of the magnet housing. This confines and concentrate the lines of magnetic flux which will increase the flux density in the interior region near the coil. This will increase the current output for a given relative rotational velocity between the magnets and the coil.

An important feature of the present embodiment resides in the vibration damped weight 20.

With the offset weight 20 freely capable of rotational movement in relation to the shaft 22, but fixed in the radial direction, any shocks or similar transitory forces directed at right angles to the shaft rotation (for example, vertically upward) can cause momentary increases in the friction between the weight bearings and the magnet housing. This can caused binding and sticking.

To reduce the effect of such transitory shocks, the present invention provides for a shock damped weight 20 which is attached to the magnet housing by way of attachment means 26. The attachment means 26 is, in the present example, two linear members or rods threaded through holes in the magnet housing 21. The weight is attached to a lower end of these members and this structure is free to slide through the magnet housing in a radial direction. During rotation of the wheel (not shown), the weight 20 will assume a stationary position in space and most shocks will be transmitted in the vertical direction. Such shocks are caused by road vibration or rough/damaged road surfaces.

First resilient means (coil springs 27) cushion the weight as it moves along the attachment means under the influence of vibration. Second resilient means 29 are also provided to absorb shocks which force the weight to the extremities of its movement where it might hit the underside of the magnet housing. In a preferred embodiment these second resilient means are rubber rings threaded onto the members 26 and interposed between the weight and the underside 32. The stop 25 is a plate secured to the upper ends of the members 26 and prevents the weight and attachment means from detaching from the magnet housing.

The effect of the first and second resilient means is to dampen any vibrations which might be transmitted to the weight 20 by road vibration or the like. If vibration builds up between the magnet housing and the shaft, any change in the rotational velocity of the shaft or damping effects brought about by the first and second resilient means and the weights' movement will interfere with the buildup of binding forces between the co-rotating components and the wheel illumination device will continue to operate properly.

Off axis transitory shocks will also be damped to some extent. Shocks of this nature will orient the weight by making it swing and extend radially so that the attachment means are temporarily parallel to the direction of the force. The weight will be displaced and the shock absorbed.

FIG. 4 illustrates a schematic cross section of the magnet housing showing the radial positions of the magnets and the enclosed alternator. In a preferred embodiment the magnets are formed from Neodymium and each provide a magnetic field of approximately 1200 gauss. Such rare earth magnets are particularly suitable for this application as they are small, lightweight and provide a magnetic field which is intense enough to power the illumination system as required.

Thrust washers (not shown) may also be used between the coil assembly and the magnet housing as if there are any axial forces, the magnet housing may bind against the winding assembly thereby reducing the effectiveness of the weight in maintaining the orientation of the magnet housing in space.

It has been found in trials that the illumination system is surprisingly insensitive to rough road conditions and that vibrations are damped sufficiently for the weight to effectively constrain the magnet housing orientation in space while the winding/coil rotates within it. The number of magnets may be varied and the cylindrical keeper component may be omitted.

The present example includes attachment means formed from two members or shafts. In an alternative embodiment, a single member may suffice with suitable modification to effect its attachment to the magnet housing.

The present invention is particularly advantageous as it can be seen that the lights, coil and connection leads do not rotate with respect to one another. When the wheel rotates, the only moving part is the weighted magnet. This avoids many of the prior art difficulties in providing electrical feed-through connections to the rotating wheel. Also, the present invention simplifies the power supply circuit as there are no switches needed to turn the lights on. The LEDs are illuminated when the wheel rotates.

LEDs have been found to be particularly advantageous when compared to incandescent light bulbs. Incandescent light bulbs have a heated filament which can be susceptible to breakage under the centrifugal forces resulting from wheel rotation.

Further, the present device can be installed onto a wheel in a single integrated unit and with very little retrofitting or modification. The units may be detached (where a unit comprises the coils/magnet/casing and mounting plate) and serviced or otherwise adjusted relatively easily when compared with prior art device. There is no need to replace any batteries and there are no complicated connections between rotating incandescent light sources and the stationary power supply system of the vehicle itself.

The present invention can use readily available components. However, the selection of the components should be made bearing in mind the typical rotation speeds of the vehicle's wheels.

Alternative constructions of the coil/magnet assembly are envisaged and these components may be interchanged in their respective movements with the requisite modifications to the output leads connection arrangement.

Thus the present invention provides for a relatively cheap, easily installed and effective means of lighting a vehicle's wheel hub while dispensing with the need for continually monitoring either battery strength or maintaining rotating feed through electric connections. It is envisaged that the use of such a device may reduce the incidence of accidents where two or more vehicles drift together while travelling multi-lane highways. This type of accident is particularly common between large trucks and cars.

A number of modifications may be made to the present invention without departing from the scope of the same. These including using lenses to distribute or focus the light from the LEDs, variations in the design of the coil/magnet arrangement and of course variations in the number, colour and intensity of the LEDs.

Wherein the aforegoing description reference has been made to elements or integers having known equivalents then such elements are incorporated as if individually set forth.

Although the invention has been described by way of example and with reference to particular embodiments, it is to be understood the modifications and/or improvements may be made without departing from the scope or spirit of the appended claims.

What is claimed is:

1. An apparatus for providing illumination on a hubcap of a rotatable wheel, the apparatus including:

an alternator coil wound onto a shaft, the alternator having output leads;

a magnet support housing shaped so as to surround the coil;

a plurality of magnets arranged radially around the coil arranged so that magnetic fields associated with the magnets induce electrical currents in the windings of the coil when moved in relation thereof, wherein the shaft is held substantially in fixed relation to the rotatable wheel and the shaft has an axis coincident with an axis of rotation of the wheel;

one or more illumination means and associated circuitry, located on the hubcap or other support structure wherein the current produced by the rotating magnets is supplied to the circuit; and a weight attached to the magnet housing and located so that magnet housing has a tendency to remain in fixed orientation in space and wherein the shaft is held in fixed relation to the hubcap and located so that when the hubcap is fixed to a wheel, rotation of the wheel causes the shaft and hence coil to rotate and the magnet housing remains substantially fixed in space thus causing a current to be induced in the coil; whereby the attachment means is adapted to allow the weight to be displaced radially with respect to the magnet in a constrained manner to provide vibration damping.

2. An apparatus as claimed in claim 1 wherein the attachment means is adapted to damp vibratory motion transmitted to the weight.

3. An apparatus as claimed in claim 1 wherein the attachment means is in the form of one or more members which slides through apertures in the magnet housing, the members being attached at one end to the weight and at the other incorporating securing means preventing the weight and members from detaching from the attachment means.

4. An apparatus as claimed in claim 1 wherein the attachment means further includes first resilient means adapted to cushion the movement of the weight and members against transitory displacements.

5. An apparatus as claimed in claim 4 wherein the first resilient means are springs arranged to return the weight and members to a fixed location with respect to the magnet housing.

6. An apparatus as claimed in claim 4 wherein the first resilient means is adapted to allow the weight and members to move through the aperture in the magnet housing in response to a transitory displacement force and then return to a static location, more preferably the first resilient means cushioning transitory downward forces.

7. An apparatus as claimed in claim 1 wherein the attachment means includes second resilient means located and adapted to cushion impact of the weight against the magnet housing when the transitory force is sufficient to move the weight to the extremities of its travel.

8. An apparatus as claimed in claim 7 wherein the second resilient means is a coil spring.

9. An apparatus as claimed in claim 4 wherein the first resilient means is a coil spring having a longitudinal axis coincident with a corresponding member onto which it is threaded and the second resilient means is a rubber ring surrounding a corresponding member and located between the weight and the magnet housing.

10. An apparatus as claimed in claim 1 wherein the magnets are cylindrical in shape and have their poles oriented towards the shaft, preferably in alternating north south orientation around the circumference of the magnet housing.

11. An apparatus as claimed in claim 10 wherein the magnets are embedded in the magnet housing and oriented so that their longitudinal axes are perpendicular to the rotational axis of the shaft.

12. An apparatus as claimed in claim 1 wherein the magnet housing incorporates a cylindrical ferrometallic sleeve substantially coaxial with the longitudinal axis of the shaft, the sleeve dimensioned and located to fit around a portion of the magnet housing to concentrate the magnetic field lines produced by the magnets.

* * * * *